United States Patent
Dyke et al.

(10) Patent No.: US 8,619,772 B2
(45) Date of Patent: Dec. 31, 2013

(54) TRACING SUPPORT IN A ROUTER

(75) Inventors: Eric Dyke, Verdun (CA); Catherine Truchan, Lorraine (CA); Andre Beliveau, Laval (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 477 days.

(21) Appl. No.: 12/643,671

(22) Filed: Dec. 21, 2009

(65) Prior Publication Data

US 2011/0149752 A1  Jun. 23, 2011

(51) Int. Cl.
*H04L 12/56* (2011.01)

(52) U.S. Cl.
USPC .............. 370/389; 370/392; 370/394

(58) Field of Classification Search
USPC ........... 370/349, 389, 392, 394, 395.2; 714/1
See application file for complete search history.

(56) References Cited

U.S. PATENT DOCUMENTS

| | | | |
|---|---|---|---|
| 7,369,556 B1 | 5/2008 | Rekhter et al. | |
| 2003/0046388 A1* | 3/2003 | Milliken | 709/224 |
| 2003/0097439 A1* | 5/2003 | Strayer et al. | 709/224 |
| 2005/0152298 A1* | 7/2005 | Thubert et al. | 370/312 |
| 2006/0028996 A1* | 2/2006 | Huegen et al. | 370/252 |
| 2008/0273534 A1 | 11/2008 | Blocksome | |
| 2009/0073973 A1* | 3/2009 | Kim et al. | 370/389 |

FOREIGN PATENT DOCUMENTS

| | | |
|---|---|---|
| EP | 1542428 A1 | 6/2005 |
| GB | 2430577 A | 3/2007 |
| WO | 2005/034465 A1 | 4/2005 |
| WO | 2008/047141 A1 | 4/2008 |

OTHER PUBLICATIONS

International Search Report from corresponding application PCT/IB2010/055965.

* cited by examiner

*Primary Examiner* — Omer Mian
(74) *Attorney, Agent, or Firm* — Alex Nicolaescu; Ericsson Canada Inc.

(57) ABSTRACT

Method and router supporting tracing of a packet therein. A first service module receives the packet and a memory module stores a tracing extension header. The extension header comprises an identifier of a receiving service module and a tracing identifier associated with the packet. The extension is stored following reception of the packet by the first service module. Optionally, the receiving module may be the first service module that further receives the packet through a network interface module. The first service module may also generate the tracing identifier associated with the packet that uniquely identifies the tracing in the receiving module. The router may comprise a second service module and a second memory module associated thereto. The first service module may further append the tracing extension header to the packet and forwards the packet to the second service module. The second memory module may then store the extension header thereupon.

17 Claims, 3 Drawing Sheets

TRACING SUPPORT IN A ROUTER

TECHNICAL FIELD

The present invention relates to router architecture and, more particularly, to enabling diagnostic of a router architecture.

BACKGROUND

Router architectures are more flexible than ever before. For instance, it is possible to configure a router to treat packets based on flexible rules without being strictly limited to address information. Yet, by doing so, a wrongly configured system could, for instance, allow packets to go through while they should be dropped, drop packets that should go through or wrongly routed packets. Even with conventional routing architectures, it is already difficult to diagnose what caused a problem given the range of potential errors. This is even more relevant given the added flexibility of newer architectures.

The present invention aims at both conventional and flexible router architectures.

SUMMARY

A first aspect of the present invention is directed to a router supporting tracing of a packet therein. The router comprises a first service module that receives the packet and a memory module that stores a tracing extension header. The tracing extension header comprises an identifier of a receiving service module of the router and a tracing identifier of a tracing associated with the packet in the router. The tracing extension is stored following the reception of the packet by the first service module.

A series of optional aspects of the router are provided hereinbelow. For instance, the router of could further comprise a network interface module. The receiving service module could be the first service module that further receives the packet through the network interface module of the router. The first service module may also generate the tracing identifier associated with the packet that uniquely identifies the tracing in the first service module.

As a first exemplary sub option, the memory module could be associated to the first module and the router may then further comprise a second service module and a second memory module associated to the second service module. The first service module may further append the tracing extension header to the packet and forwards the packet to the second service module. The second memory module may then store the tracing extension header following the reception of the packet by the second service module.

As a second exemplary sub option, the router may further comprise a second service module. The first service module may further append the tracing extension header to the packet and forward the packet to the second service module. The memory module may then further store the tracing extension header a second time following the reception of the packet by the second service module. An identifier of the second service module might be appended to the tracing extension header before the tracing extension header is stored in the memory module the second time.

The tracing extension header may further comprise a timestamp, e.g., updated before each storage of the tracing extension header in the memory module. The memory module may comprise a circular buffer that stores the tracing extension header.

In an optional aspect, the tracing identifier uniquely identifies the tracing in the receiving service module, the identifier of the receiving service module uniquely identifies the receiving service module in the router and the identifier of the receiving service module and the tracing identifier together provide a unique identifier of the packet in the router.

As a further option, the first service module may further take an action on the packet after reception thereof. The tracing extension header may then further comprise information related to the action on the packet and information concerning at least one of a sender of the packet and a receiver of the packet.

The router may also optionally comprise at least one table accessed upon reception of the packet. In such a case, the tracing extension header may then comprise an identifier of the at least one table. Examples of table comprise, for instance, an admission control table, a service module lookup table, a packet routing table, a generic treatment rule table, etc.

As a further option, the memory module may comprise a plurality of stored extension headers. The router may also comprise a tracing reporting module that reads the plurality of stored extension headers from the memory module, arranges the stored extension headers into a plurality of packet tracings and reports the plurality of packet tracings to a further network node. The stored extension headers could be arranged, for instance, based on their respective tracing identifier and their respective receiving service module identifier, a timestamp, etc.

As another option, the memory module may comprise a plurality of stored extension headers and may further receive a read request from a network node for the plurality of stored extension headers from the memory module and thereupon return the stored extension headers thereto.

Optionally, the memory module may further store at least a portion of the packet together with the tracing extension header.

A second aspect of the present invention is directed to a method for supporting tracing of a packet in a router. The method comprises the steps of receiving the packet in a service module of the router and following the step of receiving, storing a tracing extension header comprising an identifier of a receiving service module of the router and a tracing identifier of a tracing associated with the packet in the router.

A series of optional aspects of the method are provided hereinbelow. The step of receiving may further comprise receiving the packet through a network interface module of the router and generating the tracing identifier associated with the packet that uniquely identifies the tracing in the service module.

As an option, the memory module may be associated to the service module and the method may further comprises appending the tracing extension header to the packet, forwarding the packet to a second service module and storing the tracing extension header following the reception of the packet by the second service module in second memory module associated to the second service module.

As another option the method may further comprise steps of appending the tracing extension header to the packet, forwarding the packet to a second service module; and storing the tracing extension header a second time following the reception of the packet by the second service module. An identifier of the second service module may then be appended to the tracing extension header before the tracing extension header is stored in the memory module the second time.

The tracing extension header further may comprise a timestamp, e.g., updated before each storage of the tracing extension header in the memory module.

The tracing identifier may optionally uniquely identify the tracing in the receiving service module, the identifier of the receiving service module uniquely identifies the receiving service module in the router. The identifier of the receiving service module and the tracing identifier together may then provide a unique identifier of the packet in the router.

Optionally, following the step of receiving, the method may further comprise a step of taking an action on the packet in the service module. The tracing extension header may then further comprise information related to the action on the packet and information concerning at least one of a sender of the packet and a receiver of the packet.

The method may further comprise a step of accessing at least one table of the router following the step of receiving. The tracing extension header may then comprise an identifier of the at least one table.

The memory module may comprise a plurality of stored extension headers comprising, following the step of storing, the tracing extension header. The method may then further comprise the steps of reading the plurality of stored extension headers from the memory module and arranging the stored extension headers, based on their respective tracing identifier and their respective receiving service module identifier, into a plurality of packet tracings.

The method may further optionally comprise a further step of storing at least a portion of the packet together with the tracing extension header.

BRIEF DESCRIPTION OF THE DRAWINGS

For a more detailed understanding of the invention, reference can now be made to the following description, taken in conjunction with the accompanying drawings, in which.

DETAILED DESCRIPTION

The present invention supports tracing of a packet in a router. Following reception of a packet in a service module of the router, a tracing extension header is stored in memory. The tracing extension header identifies the receiving service module of the router and also comprises a tracing identifier. A portion of the packet can also optionally be stored together with the tracing extension header. As another option, information concerning actions potentially taken and tables potentially used following reception of the packet in the router may also be added to the tracing extension header before it is stored in memory.

Figure 1:
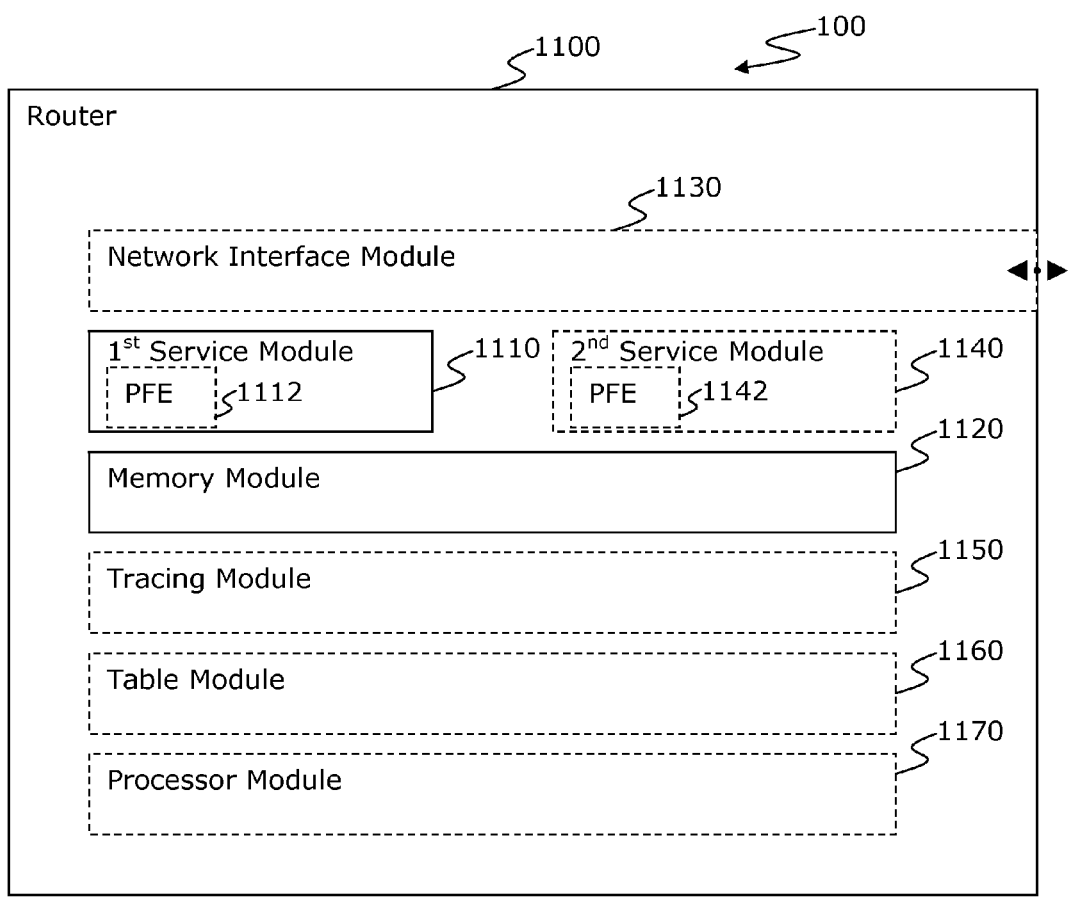
FIGS. 1 and 2 are exemplary modular representations of routers in accordance with the teachings of the present invention.
Figure 2:
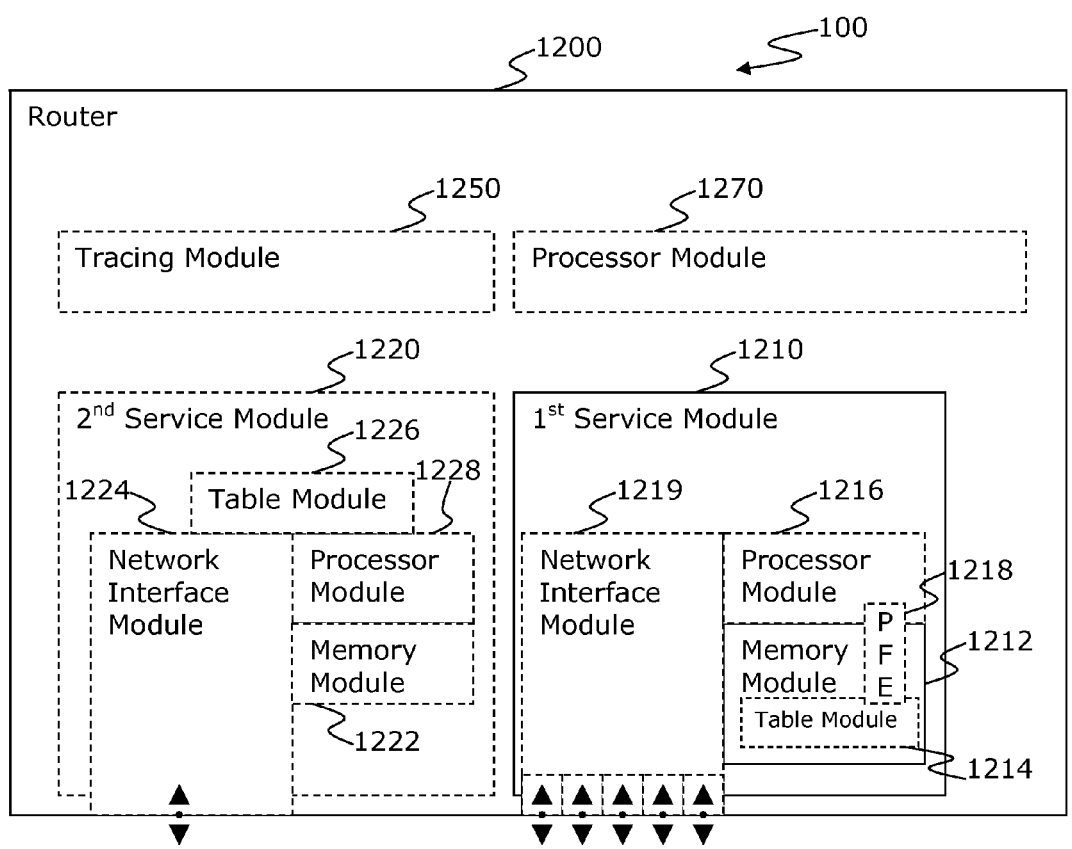

Reference is now made to the drawings in which optional aspects in relation to the present invention are drawn using dotted lines. Person skilled in the art will readily recognize that some functions or structures, while needed for the proper functioning of a traditional router, do not affect the present invention. The same reference numeral refers to the same or similar elements. Drawings present logical views of physical elements and are not drawn to scale. FIGS. 1 and 2 present two exemplary modular representations of routers 1100 and 1200 in accordance with the teachings of the present invention and will be concurrently referred to in the example provided below. The examples related to the present invention are shown in routers 1100 and 1200. It should be understood that other kinds of network nodes having means for receiving packets and memory means for storing information could also implement the present invention. The routers 1100 and 1200 are represented in a network 100. Details concerning the network 100 are not provided as persons skilled in the art will readily appreciate that the present invention is not affected thereby but can rather adapt to various networks.

On FIG. 1, the router 1100 supports tracing of a packet therein. The router 1100 comprises a first service module 1110 and a memory module 1120. Optionally, the router 1100 also comprises a second service module 1140, a network interface module 1130, a tracing module 1150, a table module 1160 and a processor module 1170.

In order to emphasize the flexibility of the present invention, FIG. 2 shows a different modular view of the router 1200, which also supports tracing of a packet therein. It should be understood that the examples of FIGS. 1 and 2 are only illustrative and that many different choices can be made in the designs of routers while still supporting the present invention. The router 1200 comprises a first service module 1210 having a memory module 1212 thereon. The memory module 1212 optionally comprises a table module 1214. The first service module 1210 optionally comprises a processor module 1216. An optional Packet Forwarding Engine 1218 is shown on FIG. 2 as a subset of the processor module 1216, the memory module 1212 and the table module 1214. The first service module 1210 may further comprise a network interface module 1219. The network interface module 1219 is shown, for the purpose of illustration, with multiple network interface ports.

A tracing module 1250 and a processor module 1270 are also shown as options of the router 1200. Optionally, the router 1200 may also comprise a second service module 1220. The second service module 1220 comprises memory module 1222, a network interface module 1224, a table module 1226 and a processor module 1228.

The first service module 1110, 1210 is a logical view of a physical hardware capable of treating packets. The first service module 1110 could be a line card in a larger chassis corresponding to the router 1100, 1200 or be a sub portion of a larger card embedding completely or partially within the router 1100, 1200. In the examples of FIGS. 1 and 2, the first service module 1110, 1210 is core to the architecture of the router 1100, 1200 as it implements the router's 1100, 1200 functionalities. As can be expected, the actual functionalities provided by the router 1100, 1200 do not affect the teachings of the present invention. It is natural though that at least one functionality is provided by the router 1100, 1200, even if it is as simple as packet switching, in order to allow for a meaningful trace. For instance, the router 1100, 1200 may comprise a Packet Forwarding Engine (PFE) 1112, 1212 for taking care of packets between more than one network ports of the router 1100, 1200. The PFE 1112, 1212, for instance, would access a set of rules (e.g., forwarding and/or treatment rules) and act on received packets accordingly. For instance, the set of rules could be implemented using a Finite State Machine that is used to order various tables lookups needed to ensure proper functionalities of the router 1100, 1200. In the best mode known to the inventors, the PFE 1112, 1212 would have a specific set of rules that would implement the present invention. Of course, this is provided only as an exemplary implementation of the present invention. On the example of FIG. 1, the first service module 1110 is shown as a distinct module from the memory module 1120. On the example of FIG. 2, the PFE 1212 is shown more particularly as a portion of each of the memory module 1212, the table module 1214 and the processor module 1270, specifically for the purpose of forwarding packets.

On FIG. 1, the second service module 1140 is further optionally shown, on the example of FIG. 1, having similar characteristics compared to the first service module 1110 (including a PFE 1142). In contrast and in order to emphasize the flexibility of the present invention, the second service module 1220 of FIG. 2 is shown with a different modular representation than the first service module 1210. While it is likely that the router 1100, 1200 have multiple service modules, e.g., 1110 and 1140 or 1210 and 1220, and that those modules share equivalent characteristics, the present invention does not require multiple modules and does not either require that different modules of the router 1100 share equivalent characteristics.

The memory module 1120, 1212 is a logical representation of various potential physical storage and/or memory structures needed to ensure proper function of the router 1100, 1200. It likely comprises a Random Access Memory (RAM) of one or more kinds and one or more solid state storage units such as a hard disk drive (HDD). Yet, none of these specific memory types are essential to the proper use of the present invention. As such, it is sufficient for the purpose of explaining the present invention to refer to the memory module 1120, 1212 and leave the memory and/or storage choices and dimensioning to person skilled in the art taking into consideration the expected performance and scale of the router 1100, 1200. That being said, it has been noted during initial testing of the present invention that performance of the router 1100, 1200 could be affected by the added storing to the memory module 1120, 1212 prescribed by the present invention if it was not properly taken into consideration. As can be expected, the above comments concerning the memory module 1120, 1212 also applies to the other exemplary memory modules.

The network interface module 1130, 1219 is a logical representation of various potential network interface structures needed to ensure proper function of the router 1100, 1200. In the context of the present invention, the network interface module 1130, 1219 is not essential as the packet being received by the first service module 1110, 1210 could actually be received from another portion of the first service module 1110, 1210 (e.g., passes through the first service module more than once) or be received from another service module (e.g., the second service module 1140, 1220) without involvement of the network interface module 1130, 1219. In order to avoid having to describe the various details that are related to a specific interface's handling of packets, the present description refers to the network interface module 1130, 1219 whenever an exchange of packets involves a network interface. As such, a person skilled in the art will readily recognize that, whenever relevant to the described invention, the important aspect of the network interface module 1130, 1219 is to be able, in some of the various examples, to receive or deliver a packet to higher level layers for treatment by the present invention. Even though the best effects of the present invention is observed when the packet is treated by the present invention as low as possible in the network layers, there is no requirement from the present invention to work at any specific layer. The different network interface modules can represent one or more physical ports, as is better seen when comparing the examples of FIG. 1 (1130) and FIG. 2 (1219). Likewise, the network interface module 1130, 1219 can be of various physical characteristics over which one or multiple network protocols are used without affecting the present invention. For example, the network interface module 1130, 1219 can connect, e.g., one or more optical fibers, coax copper cables and/or a twisted pair cables. Similarly, the network protocol used over the physical support on the network interface module 1130, 1219 could be one or more of, e.g., SONET, DSL and/or ethernet. As can be expected, the above comments concerning the network interface module also applies to the other exemplary network interface modules (e.g., 1224).

The tracing module 1150, 1250 is a logical representation of a set of instructions optionally available in the router 1100, 1200 to execute some optional portions of the present invention.

The table module 1160, 1214 is a logical representation of one or more tables optionally available in the router 1100, 1200 to maintain different set of rules. As mentioned with reference to the first service module 1110, 1210, the PFE 1112, 1212 could make use of such rules, optionally stored in the table module 1160, 1214, to provide the functionality of the router 1100, 1200. For instance, the table module 1160, 1214 could maintain one or more lookup tables to allow packet forwarding between the first service module 1110, 1210 and the second service module 1140, 1220, one or more generic rule tables that could support the present invention, an admission control table, a packet routing table, etc.

The processor module 1170, 1216, 1228, 1270 is a logical representation of various potential physical processor structures needed to ensure proper function of the router 1100, 1200. The processor module 1170 of FIG. 1 may comprise a plurality of processors distributed over the router 1100 with specific capabilities (e.g., network processor used by the first service module 1110, memory access processor used by the memory module 1120, generic processor used to ensure coordination and proper overall function of the router 1100, etc.). FIG. 2 shows a plurality of processors modules 1216, 1228 and 1270 distributed over the router 1200 with specific focus. The processor module 1216, 1228 is for use by a service module and likely handles packet forwarding tasks (as illustrated, e.g., by the PFE 1212), memory access tasks, general tasks of its service module, etc. The processor module 1270 likely handles generic tasks, control information handling tasks for the router 1200, etc. The processor module 1270 could further be located on a further control module (not shown) of the router 1200.

The processor module 1170, 1216, 1228, 1270 may comprise one or more of a single processor, a multi processor array, specific Application-Specific Integrated Circuit (ASIC) processors, etc. Likewise, the tracing module 1150, 1250 may be seen as a set of specific instructions available through the processor module 1170, 1216, 1228, 1270 or as a specific sequence of generic instructions made available by the processor module 1170, 1216, 1228, 1270 or one of its constituent.

The communication technique used between the various modules of the router 1100, 1200 is not explicitly shown on FIG. 1 or FIG. 2. The present invention is not affected by the way the different modules exchange information between them. For instance, the memory module 1120, 1212 and the processor module 1170, 1216, 1228, 1270 could be connected by a parallel bus, but could also be connected by a serial connection or involve an intermediate module (not shown) without affecting the teachings of the present invention. A unique interconnection or a mix of different interconnections can actually be present in the router 1100, 1200 between the various modules without affecting the teachings of the present invention.

In the example of FIGS. 1 and 2, the first service module 1110, 1210 receives a packet for which a trace is to be produced. The router 1100, 1200 may become aware that a trace needs to be produced because, for instance, all packets transiting therethrough needs to be traced or because the packet contains information that match a tracing rule present in the router. The exact manner in which the router 1100, 1200 becomes aware of the need to trace is part of the optional aspects of the present invention. Following the reception of the packet, the memory module 1120, 1212 stores a tracing extension header comprising an identifier of a receiving service module and a tracing identifier of a tracing associated with the packet in the router 1100, 1200. In the examples shown, the receiving module may be the first service module 1110, 1210 or a different service module (e.g., the second service module 1140, 1220).

In one potential use of the invention, the receiving service module could be the first service module 1110, 1210. The packet could be received from the network interface module 1130, 1219. Upon reception of the packet, there could be no tracing extension header thereon. In this exemplary option, the first service module 1110, 1210 generates the tracing identifier associated with the packet that uniquely identifies the tracing in the first service module 1110, 1210. The identifier of the receiving service module would then correspond to the first service module 1110, 1210. Even if the packet did not travel in the router 1100, 1200 through another service module before reaching the first service module 1110, 1210, it may already comprise a tracing extension header thereby enabling tracing of the packet in the router 1100 and 1200 as well as other network nodes that handled the packet before reception in the first service module 1110, 1210.

In the examples shown, the tracing identifier uniquely identifies the tracing in the receiving service module. The identifier of the receiving service module uniquely identifies the receiving service module in the router 1100, 1200. The identifier of the receiving service module and the tracing identifier together provide a unique identifier of the packet in the router 1100, 1200. This structure of explicit and implicit unique identifiers may be useful in some traces. It should further be noted that the identifier of the receiving service module could be an identifier of the PFE 1112, 1212 if ever applicable.

Following the storage in the memory module 1120, 1212, the first service module 1110, 1210 may determine that there is a need to forward the packet to the second service module 1140, 1220. If such is the case, the first service module 1110, 1210 then appends the tracing extension header to the packet and forwards the packet to the second service module 1140, 1220. The second service module 1140, 1220 would then store the tracing extension header following the reception of the packet thereby.

In the example of FIG. 1, in order to differentiate between the storage performed by the first service module 1110 and the second service module 1140, the second service module 1140 may add an identifier of its own to the tracing extension header. In the example of FIG. 2, the memory module 1222 is actually distinct between the first and second service modules 1210 and 1220, which could be sufficient to distinguish the two stored extension headers. As another option, the tracing extension header may also always comprise an identifier of the storing service module (even upon the first storage) or only comprise an identifier for subsequent storage.

It is also possible, some exemplary implementations, to add a timestamp to the tracing extension header. The timestamp would then be updated at some point after reception of the packet and before storage of the tracing extension header in the memory module 1120, 1212, 1222. While it is unlikely that it would make a tangible difference in the tracing result, the timestamp could be generated just before storage or upon reception of the packet. The timestamp could also be used as an added information to distinguish the receiving service module from a further service module. Optionally, the router 1100, 1200 or a module thereof could use a synchronization protocol (e.g., Network Time Protocol (NTP)) to increase the reliability of the timestamp. A hop counter could also optionally be added to the tracing extension header (e.g., starting at 0 and increasing each time the tracing extension header is stored or decreasing from a maximum number of traced steps to 0, which makes the extension header thereafter ignored).

In terms of structure of the memory module 1120, 1212, it could be useful to define a circular buffer to store the tracing extension header. While a person skilled in the art would have to properly dimension the circular buffer, it would likely increase the efficiency of the tracing extension header storage.

The tracing extension header may also comprise other information concerning an action taken on the packet by a service module. Examples of actions taken include: continue analysis in another table of the table module or in another service module, send the packet to a specific port of a network interface module, drop the packet, etc. The actual destination of the packet (e.g., port information) could be added to the tracing extension header. The action taken could also be to add/remove/modify information elements in the packet itself. The information concerning the action taken on the packet could thus also include the information element or a portion thereof.

The tracing extension header could also comprise information concerning at least one of a sender of the packet and a receiver of the packet. Likewise, information concerning one or more tables of the table module 1160, 1214, 1226 optionally accessed upon reception of the packet may also be included in the tracing extension header. A portion of the packet itself (e.g., some or all of the packet header fields) or the complete packet may also be stored together with the tracing extension header or with reference from or to the trace extension header.

Once the tracing extension header is stored, there are multiple uses that could be made thereof. An example of such is provided for the sake of completeness, but it should be noted that the present invention does not prescribe any means of using the tracing extension header, but rather teaches a means to support the tracing of one or more packets within the router 1100, 1200. In order to build a trace, it would be expected that a plurality extension headers are stored in the memory module 1120, 1212 and/or 1222. The tracing module 1150, 1250 would then read the plurality of stored extension headers from the memory module 1120, 1212 and/or 1222 and arrange them, based on their respective tracing identifier and their respective receiving service module identifier, into a plurality of packet tracings. The tracing module 1150, 1250 could also add a service module identifier, especially in the example of FIG. 2 where the memory module 1212 and 1222 are locally located in different service modules. As a person skilled in the art will readily recognize, it is also possible to arrange the stored extension headers based on other parameters such as, if present, the timestamps. The tracing module 1150, 1250 would then report the plurality of packet tracings to a network node. Alternatively, the router 1100, 1200 could also receive a read request from the network node for the plurality of stored extension headers from the memory module 1120, 1212 and/or 1222 and thereupon return the stored extension headers thereto (adding or not a service module identifier as might be needed).

Figure 3:
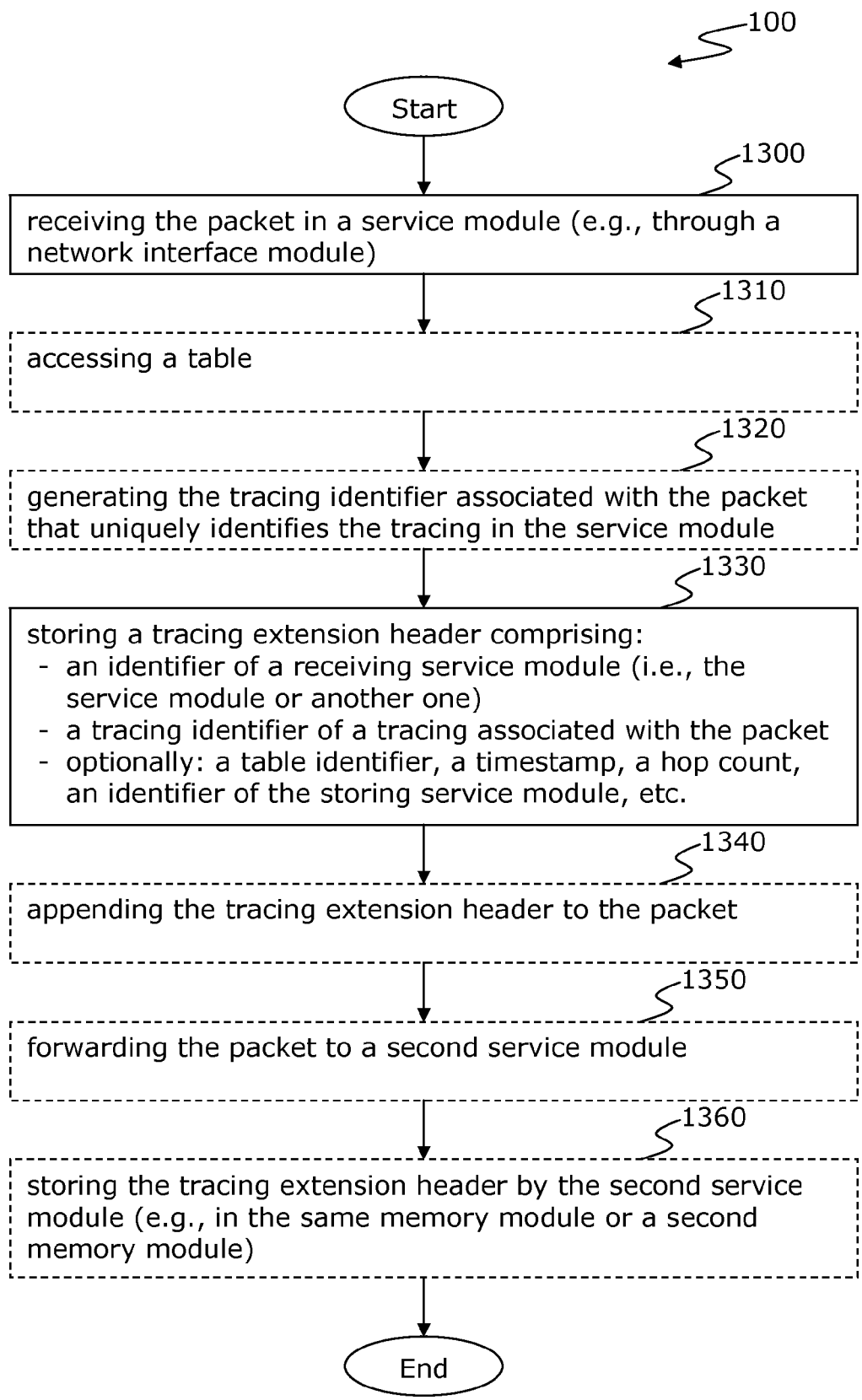
FIG. 3 shows an exemplary flow chart in accordance with the teachings of the present invention.

FIG. 3 shows an exemplary flow chart in accordance with the teachings of the present invention. As a first step, a packet is received 1300 in a service module. The packet could, for instance, be received from another service module or through a network interface module. Upon reception of the packet, the service module may access a table 1310, e.g., to treat, the packet. The step 1310 may not be needed, as explained previously, depending on the context in which the present invention is executed. Similarly, a step of generating 1320 a tracing identifier associated with the packet that uniquely identifies the tracing in the service module may optionally be needed. Alternatively, the tracing identifier could be read from the packet or be obtained from another source.

Thereafter, a tracing extension header is stored 1330 in memory. The tracing extension header comprises an identifier of a receiving service module (i.e., from the service module or another one) and the tracing identifier. The tracing extension header may optionally comprise one or more table identifiers, a timestamp, a hop count, an identifier of the storing service module (at all times or upon subsequent storing), etc. as previously described. Optionally, step 1330 may comprise storing at least a portion of the packet itself.

If necessary, the service module may thereafter append 1340 the tracing extension header to the packet and forward 1350 the packet to a second service module. If such is the case, the second module may further store 1360 the tracing extension header (e.g., in the same memory module or a second memory module). The step 1360 may also comprise adding, for instance, an identifier of the storing service module.

The memory may comprise a plurality of stored extension headers. The records may be thereafter read and arranged, based on their respective tracing identifier and their respective receiving service module identifier, into a plurality of packet tracings before being sent to a requesting network node.

As a more specific implementation example, the present invention can be implemented in the context of a Service Path Routing (SPR) that provides a very flexible framework to control the flow of packets within a "site". The framework allows packets to be traced and therefore understand how specific packets are treated by the framework.

To decide what to do with packets, SPR uses a combination of analysis tables to determine how a packet should be routed. Locally on each machine, a PFE (Packet Forwarding Engine) holds those tables and executes a Finite State Machine (FSM) which traverses those tables. The result of each table lookup can be, for instance, to continue analysis in another table, to send the packet to a specific service module (SM), service module building block (SBB) or port or to drop the packet.

The table results can also indicate to the PFE to modify the packet (e.g., add/remove/modify information elements in the packet). The main usage of the packet modification capability is to add "extensions" to the packet in order to reduce the number of "packet parsing" by applications along the path through SPR taken by the packet.

The tracing framework allows the path taken by a packet through SPR to be traced. The framework can explain through which SM/SBB/Port the packet went through and also which tables were visited along the way. A tracing extension header is defined as a marker coloring the packet which carries a unique identifier for each "path through SPR" to be traced and a "unique" packet-ID In the PFE, when a corresponding rule is met and the tracing extension is not already included, the PFE adds the tracing extension and populates certain fields according to the rule and other fields based on local information. The tracing extension could comprise a MarkerId (16 bits), a SmId (8 bits), a HopCnt (8 bits).

The MarkerId is a specific unique identifier local to a service module holding the PFE. It is incremented monotonically every time a new tracing extension is added (e.g., every time the tracing rule is met). SMid is an identifier of a Service module where the extension is initially added. HopCnt is a counter which starts with 0 and is increased by each PFE visited. By combining MarkerId and SmId a unique identifier for each traced packet is obtained.

After the packet has been marked, and along the path through SPR, every time the traced packed traverses a PFE, (from/to network and/or from/to apps), it dumps the collected information to a memory. The PFE should perform this "dumping" in a very efficient way with as little impact as possible on the performance.

A separate thread could then assemble the collected data into a network message and send it over to an interested entity. The stored extension header can be kept on the PFE in a (limited) circular buffer. If the buffer gets full, a message can be sent to the interested entity to indicate overflow/end of overflow.

The collected data can include Pfe-smid, MarkerId, HopCnt, SMid of "first PFE", drop (True/False), Next port (valid if drop is false), timestamp, [Rule Id] (only if HopCnt==0), [tables identifier number], [list of traversed tableId and keyValues extracted], [Packet In] (with possible maximum number of bytes), [Packet Out] (valid only if drop=false and with possible maximum number of bytes).

The collected data can be saved by the interested entity in different structures. For each MarkerId, a list of "traced info structure" can be linked to it, preferably sorted by HopCnt. The interested entity could generate a specific trace file compatible with known software specifically built and optimized to analyze traces. Alternatively, the result could be sent directly into such applications.

It may also be possible to provide a specific library to applications that use the SPR to properly handle the present invention therein. There could be a number of opaque fields (time to live, originating port, trace extension) which the application can read but cannot modify. The application could nevertheless clear the fields, which would then make the packet considered as a "new packet" in SPR. Otherwise, the packet is considered as continuing on the same path through SPR.

Although several aspects of the present invention have been illustrated in the accompanying Drawings and described in the foregoing Detailed Description, it will be understood that the invention is not limited to the disclosed aspects, but is capable of numerous rearrangements, modifications and substitutions without departing from the teachings of the invention.

What is claimed is

1. A router supporting tracing of a packet, comprising:
a first service module configured to:
  receive the packet through a network interface;
a memory module configured to:
  store a tracing extension header comprising an identifier of the first service module of the router and a tracing identifier of a tracing associated with the packet in the router, wherein the tracing extension header is stored following the reception of the packet by the first service module; and
a second service module configured to:
  receive the packet from the first service module;
wherein the first service module is further configured to:
append the tracing extension header to the packet and to forward the packet to the second service module, generate the tracing identifier, if the packet does not comprise the tracing extension header upon reception of the packet by the first service module and read the tracing identifier from the packet, if the packet comprises the tracing extension header upon reception of the packet by the first service module, wherein the second service module is further configured to:

store the tracing extension header in the memory module following the reception of the packet by the second service module, and to add an identifier of the second service module to the tracing extension header before storing the tracing extension header in the memory module;

wherein the tracing identifier, together with the identifier of the first service module, uniquely identifies the tracing in the first service module.

2. The router of claim 1 wherein the tracing extension header further comprises a timestamp updated before each storage of the tracing extension header in the memory module.

3. The router of claim 1 wherein the tracing extension header further comprises a timestamp.

4. The router of claim 1 wherein the memory module comprises a circular buffer that stores the tracing extension header.

5. The router of claim 1 wherein the first service module takes a further action on the packet after reception thereof, the tracing extension header further comprises: information related to the further action on the packet; and information concerning at least one of a sender of the packet and a receiver of the packet.

6. The router of claim 1, further comprising at least one table accessed upon the reception of the packet by the first service module, the tracing extension header comprising an identifier of the at least one table.

7. The router of claim 6 wherein the at least one table is one of:
an admission control table;
a service module lookup table;
a packet routing table; or
a generic treatment rule table.

8. The router of claim 1, wherein the memory module comprises a plurality of stored extension headers including the tracing extension header and wherein the plurality of stored extension headers comprises the tracing extension header upon storage thereof, the router further comprising a processor module configured to:

read the plurality of stored extension headers from the memory module;

arrange the stored extension headers, based on their respective tracing identifier and their respective receiving service module identifier, into a plurality of packet tracings; and report the plurality of packet tracings to a further network node.

9. The router of claim 1, wherein the memory module comprises a plurality of stored extension headers, wherein the plurality of stored extension headers comprises the tracing extension header upon at least one of the storing by the first service module and the second service module and wherein the memory module further receives a read request from a network node for the plurality of stored extension headers from the memory module and thereupon returns the stored extension headers thereto.

10. The router of claim 1, wherein the memory module further stores at least a portion of the packet together with the tracing extension header.

11. A method for supporting tracing of a packet in a router comprising the steps of:

receiving, through a network interface, the packet in a first service module of the router;

storing for a first time, in a memory module of the router, a tracing extension header comprising an identifier of the first service module of the router and a tracing identifier of a tracing associated with the packet in the router; and appending the tracing extension header to the packet by the first service module;

following the step of appending, forwarding the packet to a second service module by the first service module and receiving the packet by the second service module; and storing, in the memory module, the tracing extension header for a second time following the reception of the packet by the second service module, wherein an identifier of the second service module is added to the tracing extension header before the tracing extension header is stored in the memory module for the second time;

wherein the tracing identifier of the tracing associated with the packet together with the identifier of the first service module, uniquely identifies the tracing in the first service module;

wherein upon receiving the packet in the first service module, if the packet does not comprise a tracing extension header, generating, by the first service module, the tracing identifier and if the packet comprises the tracing extension header, reading, by the first service module, the tracing identifier from the packet.

12. The method of claim 11 wherein the tracing extension header further comprises a timestamp updated before each storage of the tracing extension header in the memory module.

13. The method of claim 11 wherein the tracing extension header further comprises a timestamp.

14. The method of claim 11 further comprising, following the step of receiving, a step of taking a further action on the packet in the service module, the tracing extension header further comprises:

information related to the further action on the packet; and information concerning at least one of a sender of the packet and a receiver of the packet.

15. The method of claim 11 further comprising a step of accessing at least one table of the router following the step of receiving the packet in the first service module, the tracing extension header comprising an identifier of the at least one table.

16. The method of claim 11, wherein the memory module comprises a plurality of stored extension headers comprising, following at least one of the steps of storing, the tracing extension header, the method further comprising the steps of:

reading the plurality of stored extension headers from the memory module; and arranging the stored extension headers, based on their respective tracing identifier and their respective receiving service module identifier, into a plurality of packet tracings.

17. The method of claim 11 further comprising a step of storing at least a portion of the packet together with the tracing extension header.

* * * * *